US009460133B2

(12) United States Patent
Nojima

(10) Patent No.: US 9,460,133 B2
(45) Date of Patent: Oct. 4, 2016

(54) DATA MANAGEMENT APPARATUS, DATA MANAGEMENT METHOD AND DATA MANAGEMENT PROGRAM

(75) Inventor: Akira Nojima, Minato-ku (JP)

(73) Assignee: TOSHIBA MITSUBISHI-ELECTRIC INDUSTRIAL SYSTEMS CORPORATION, Toyko (JP)

( * ) Notice: Subject to any disclaimer, the term of this patent is extended or adjusted under 35 U.S.C. 154(b) by 218 days.

(21) Appl. No.: 14/356,514

(22) PCT Filed: Jun. 26, 2012

(86) PCT No.: PCT/JP2012/066198
§ 371 (c)(1),
(2), (4) Date: May 6, 2014

(87) PCT Pub. No.: WO2014/002176
PCT Pub. Date: Jan. 3, 2014

(65) Prior Publication Data
US 2014/0297638 A1 Oct. 2, 2014

(51) Int. Cl.
G06F 17/30 (2006.01)
G05B 19/418 (2006.01)
(52) U.S. Cl.
CPC ..... *G06F 17/30312* (2013.01); *G05B 19/4183* (2013.01); *G05B 2219/37532* (2013.01); *G05B 2219/37533* (2013.01); *Y02P 90/10* (2015.11)
(58) Field of Classification Search
USPC .................................. 707/736; 342/378, 387
See application file for complete search history.

(56) References Cited

U.S. PATENT DOCUMENTS

| 6,094,684 A | * | 7/2000 | Pallmann | .................. G06F 9/54 |
| | | | | 709/227 |
| 2004/0230395 A1 | | 11/2004 | Basto | |
| 2007/0133701 A1 | | 6/2007 | Iwami | |
| 2011/0273334 A1* | | 11/2011 | Karr | ....................... G01S 13/825 |
| | | | | 342/378 |

FOREIGN PATENT DOCUMENTS

CN 1806293 A 7/2006
CN 101026440 A 8/2007
(Continued)

OTHER PUBLICATIONS

Combined Chinese Office Action and Search Report issued Oct. 26, 2015 in Patent Application No. 201280058775.3 (with English translation of categories of cited documents).
(Continued)

*Primary Examiner* — Hung T Vy
(74) *Attorney, Agent, or Firm* — Oblon, McClelland, Maier & Neustadt, L.L.P.

(57) ABSTRACT

An apparatus includes: the arrangement pattern sampling data generator 111*b* for generating the arrangement pattern sampling; the bit pattern sampling data generator 111*c* for, each time process data are acquired from the controllers 51 to 5*n*, generating the bit pattern sampling; the calculator 111*d* for calculating the number-of-change-points threshold value indicating the threshold value for the number of process data each including the chronological change on the basis of the data size needed to store the elapsed times and the sampling cycles (the acquisition intervals) for the process data acquisition; and the storage controller 111*a* for storing any one of the bit pattern sampling data and the arrangement pattern sampling data, which requires a smaller storage capacity, into the storage unit 113.

6 Claims, 16 Drawing Sheets

(56) References Cited

FOREIGN PATENT DOCUMENTS

| | | |
|---|---|---|
| CN | 101983486 A | 3/2011 |
| JP | 6 209493 | 7/1994 |
| JP | 10 69498 | 3/1998 |
| JP | 2001 5516 | 1/2001 |
| JP | 2002 163180 | 6/2002 |
| JP | 2004 274201 | 9/2004 |
| JP | 2009 205486 | 9/2009 |
| JP | 2009 251874 | 10/2009 |
| JP | 2010 271850 | 12/2010 |
| JP | 2011 237929 | 11/2011 |
| JP | 2012 18438 | 1/2012 |
| WO | WO 2008/055179 A2 | 5/2008 |
| WO | 2012 004954 | 1/2012 |

OTHER PUBLICATIONS

International Search Report Issued Septembers 18, 2012 in PCT/JP12/066198 Filed Jun. 26, 2012.

\* cited by examiner

FIG. 5

| ITEM NAME | Type | Size |
|---|---|---|
| HEAD UTC TIME | int54 | 8 |
| HEAD UTC 1/10 MILLISECOND | DWORD | 4 |
| BLANK | DWORD | 4 |
| BLOCK DATA SIZE | DWORD | 4 |
| HEADER-IN-BLOCK SIZE | DWORD | 4 |
| NUMBER OF BLOCK ITEMS | DWORD | 4 |
| BLANK | DWORD | 4 |

| ITEM NAME | Type | Size |
|---|---|---|
| HEAD VALUE | VARIABLE (*9) | VARIABLE (*9) |
| TAIL VALUE | VARIABLE (*9) | VARIABLE (*9) |
| UPPER LIMIT VALUE | VARIABLE (*9) | VARIABLE (*9) |
| LOWER LIMIT VALUE | VARIABLE (*9) | VARIABLE (*9) |

| HEADER IN BLOCK (*7) |
|---|
| 10-MINUTE RANGE DATA FOR ITEM 1 (*8) |
| 10-MINUTE RANGE DATA FOR ITEM 2 (*8) |
| 10-MINUTE RANGE DATA FOR ITEM 3 (*8) |
| ⋮ |
| 10-MINUTE RANGE DATA FOR ITEM N (*8) |

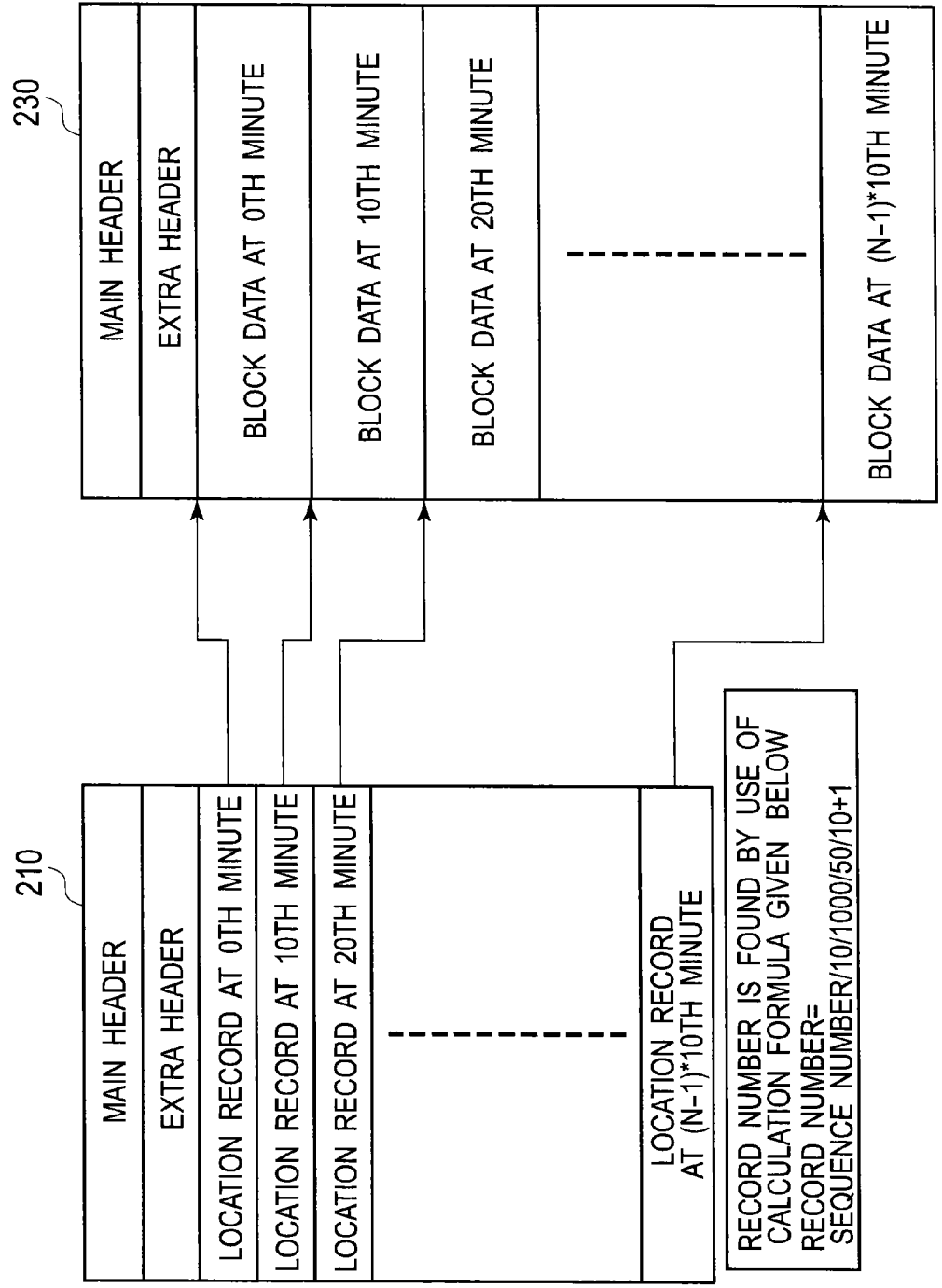

| ITEM NAME | Type | Size |
|---|---|---|
| OFFSET DATA OF CHANGE POINT 1 | DWORD | 2 |
| : | : | : |
| OFFSET DATA OF CHANGE POINT M | DWORD | 2 |

| ITEM NAME | Type | Size |
|---|---|---|
| THE CHANGE INFORMATION OF (1 ~ 8) TIMES | BYTE | 1 |
| : | : | : |
| THE CHANGE INFORMATION OF (M-7 ~ M) TIMES | BYTE | 1 |

FIG. 15

| | 301 | 302 | 303 | 304 | 305 | 306 | 307 | 308 | 309 | 310 | 311 | 312 | 313 | 314 | 315 | 316 |
|---|---|---|---|---|---|---|---|---|---|---|---|---|---|---|---|---|
| | 1 | 0 | 0 | 0 | 0 | 0 | 0 | 0 | 0 | 1 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | . | . | . | . | . | . | . | . | . | . | . | . | . | . | . | . |
| | 0 | 0 | 0 | 0 | 0 | 0 | 0 | 0 | 0 | 0 | 0 | 0 | 0 | 0 | 0 | 0 |

2930

DATA MANAGEMENT APPARATUS, DATA MANAGEMENT METHOD AND DATA MANAGEMENT PROGRAM

TECHNICAL FIELD

The present invention relates to a data management apparatus, a data storage method and a data storage program for storing process data acquired from a monitoring target in a plant.

BACKGROUND ART

As an apparatus configured to collect various data from a monitoring target in a plant, Patent Document 1, for example, has proposed a data collection apparatus which collects binary data on control information outputted by a control apparatus to an iron and steel plant; collects binary data on event information on the iron and steel plant to be controlled by use of the control information outputted by the control apparatus; adds a common key to the binary data on the control information and the binary data on the event information which are collected at the same time; and accumulates the binary data on the control information with the added common key while accumulating the binary data on the event information with the added common key.

PRIOR ART DOCUMENT

Patent Document

Patent Document 1: Japanese Patent Application Publication No. 2010-271850

SUMMARY OF THE INVENTION

Problem to be Solved by the Invention

When, however, the data collection apparatus described in Patent Document 1 is applied to a large-scale plant control system, a problem arises that a large-capacity storage medium is needed to store process data.

The present invention has been carried out with the foregoing problem taken into consideration. The present invention aims at providing a data management apparatus, a data management method and a data management program which are designed to store a large amount of process data into a relatively small storage area.

For the purpose of achieving the foregoing object, a first feature of a data management apparatus of the present invention is that the data management apparatus includes: an arrangement pattern sampling data generator for generating arrangement pattern sampling data in which process data acquired from a monitoring target and including a chronological change, and an elapsed time from a reference point of time to a point of time of the chronological change are associated with each other; a bit pattern sampling data generator for, each time process data are acquired from the monitoring target, generating bit pattern sampling data in which a flag indicating the presence or absence of the chronological change in the process data acquired from the monitoring target, and the process data acquired from the monitoring target and including the chronological change are associated with each other; and a storage controller for storing any one of the bit pattern sampling data and the arrangement pattern sampling data, which requires a smaller storage capacity, into a storage unit.

In addition, a second feature of the data management apparatus of the present invention is that the data management apparatus further includes a calculator for calculating a number-of-change-points threshold value indicating a threshold value for the number of process data each including the chronological change on the basis of a data size needed to store the elapsed time and acquisition intervals for the process data acquisition. Here, each time process data are acquired from the monitoring target, the storage controller stores the bit pattern sampling data if the number of process data each including the chronological change is greater than the change-point threshold value calculated by the calculator, or stores the arrangement pattern sampling data if the number of process data each including the chronological change is less than the change-point threshold value calculated by the calculator.

Furthermore, a first feature of a data management method of the present invention is that the data management method includes: an arrangement pattern sampling data generating step of generating arrangement pattern sampling data in which process data acquired from a monitoring target and including a chronological change, and an elapsed time from a reference point of time to a point of time of the chronological change, are associated with each other; a bit pattern sampling data generating step of, each time process data are acquired from the monitoring target, generating bit pattern sampling data in which a flag indicating the presence or absence of the chronological change in the process data acquired from the monitoring target, and the process data acquired from the monitoring target and including the chronological change are associated with each other; and a storage controlling step of storing any one of the bit pattern sampling data and the arrangement pattern sampling data, which requires a smaller storage capacity, into a storage unit.

Moreover, a second feature of the data management method of the present invention is that the data management method further includes a calculating step of calculating a number-of-change-points threshold value indicating a threshold value for the number of process data each including the chronological change on the basis of a data size needed to store the elapsed time and acquisition intervals for the process data acquisition. Here, each time process data are acquired from the monitoring target, the bit pattern sampling data is stored in the storage controlling step if the number of process data each including the chronological change is greater than the change-point threshold value calculated in the calculating step, or the arrangement pattern sampling data is stored in the storage controlling step if the number of process data each including the chronological change is less than the change-point threshold value calculated in the calculating step.

In addition, a first feature of a data management program of the present invention is that the data management program causes a computer to execute: an arrangement pattern sampling data generating step of generating arrangement pattern sampling data in which process data acquired from a monitoring target and including a chronological change, and an elapsed time from a reference point of time to a point of time of the chronological change are associated with each other; a bit pattern sampling data generating step of, each time process data are acquired from the monitoring target, generating bit pattern sampling data in which a flag indicating the presence or absence of the chronological change in the process data acquired from the monitoring target, and the process data acquired from the monitoring target and including the chronological change are associated with each other; and a storage controlling step of storing any one of the bit pattern sampling data and the arrangement pattern sampling data, which requires a smaller storage capacity, into a storage unit.

What is more, a second feature of the data management program of the present invention is that the data management program further causes the computer to execute a calculating step of calculating a number-of-change-points threshold value indicating a threshold value for the number of process data each including the chronological change on the basis of a data size needed to store the elapsed time and acquisition intervals for the process data acquisitions. Here, each time process data are acquired from the monitoring target, the bit pattern sampling data is stored in the storage controlling step if the number of process data each including the chronological change is greater than the change-point threshold value calculated in the calculating step, and the arrangement pattern sampling data is stored in the storage controlling step if the number of process data each including the chronological change is less than the change-point threshold value calculated in the calculating step.

The data management apparatus, the data management method and the data management program of the present invention are capable of storing a large amount of process data into a relatively small storage area.

FIG. 5 is a diagram showing an example of block data on the 10-minute range data file stored in the range data storage section in the storage unit included in the data management apparatus of the first embodiment of the present invention.

FIG. 6 is a diagram explaining a relationship between the 10-minute range data location file and the 10-minute range data file which are stored in the range data storage section in the storage unit included in the data management apparatus 1 of the first embodiment of the present invention.

Figure 7:
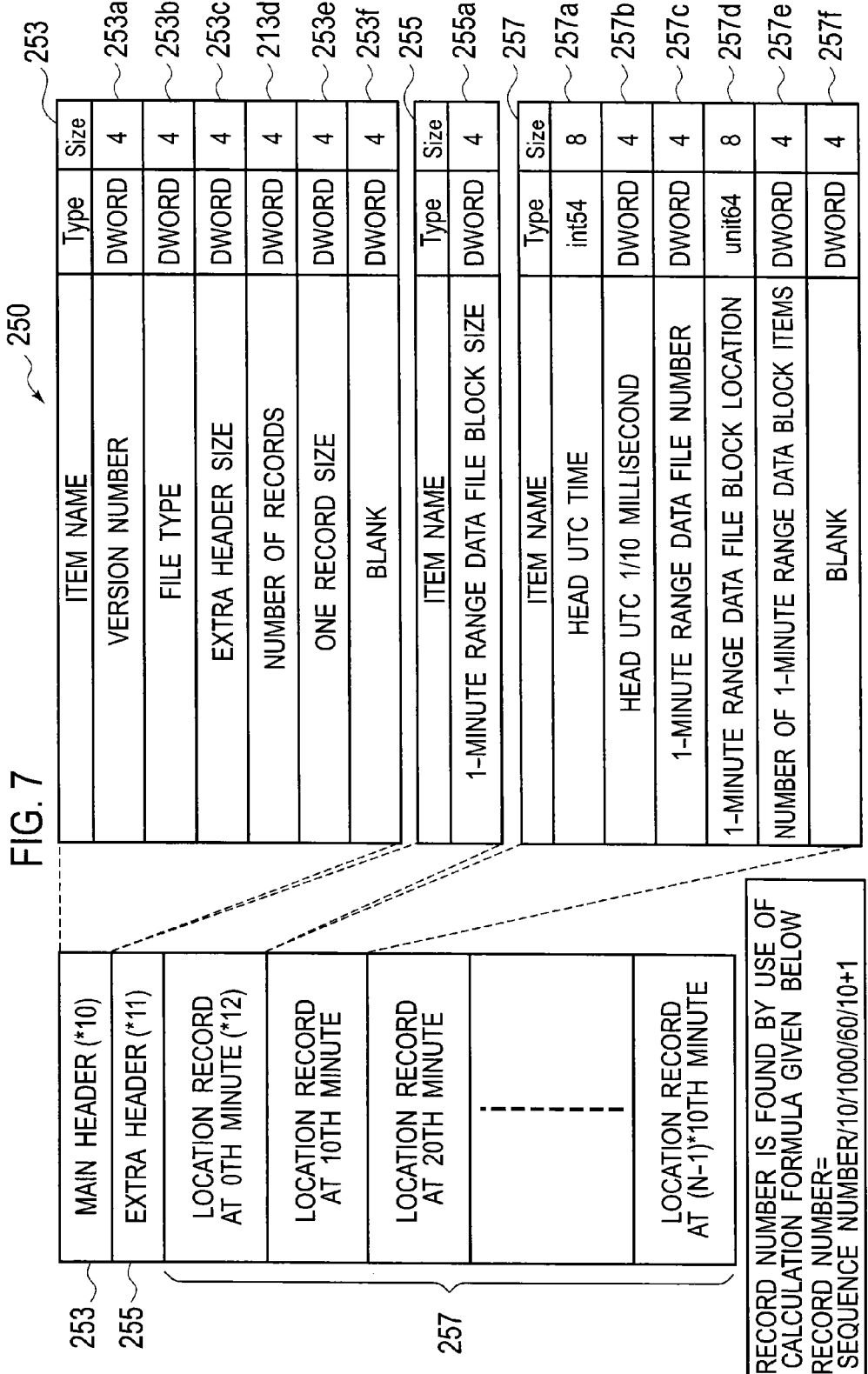

FIG. 7 is a diagram showing an example of a 1-minute range data location file stored in the range data storage section in the storage unit included in the data management apparatus of the first embodiment of the present invention.

Figure 8:
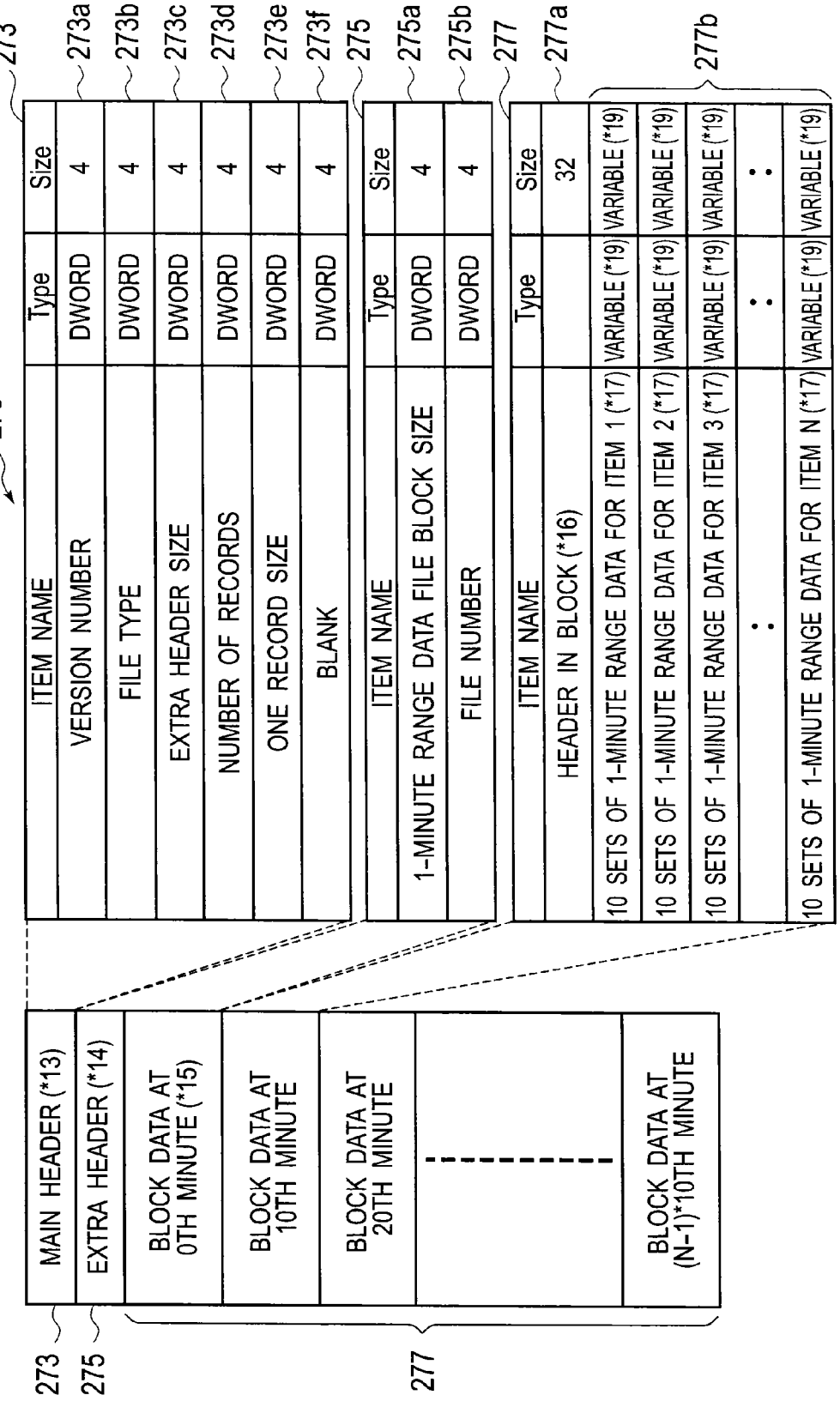

FIG. 8 is a diagram showing an example of a 1-minute range data file stored in the range data storage section in the storage unit included in the data management apparatus of the first embodiment of the present invention.

Figure 9:
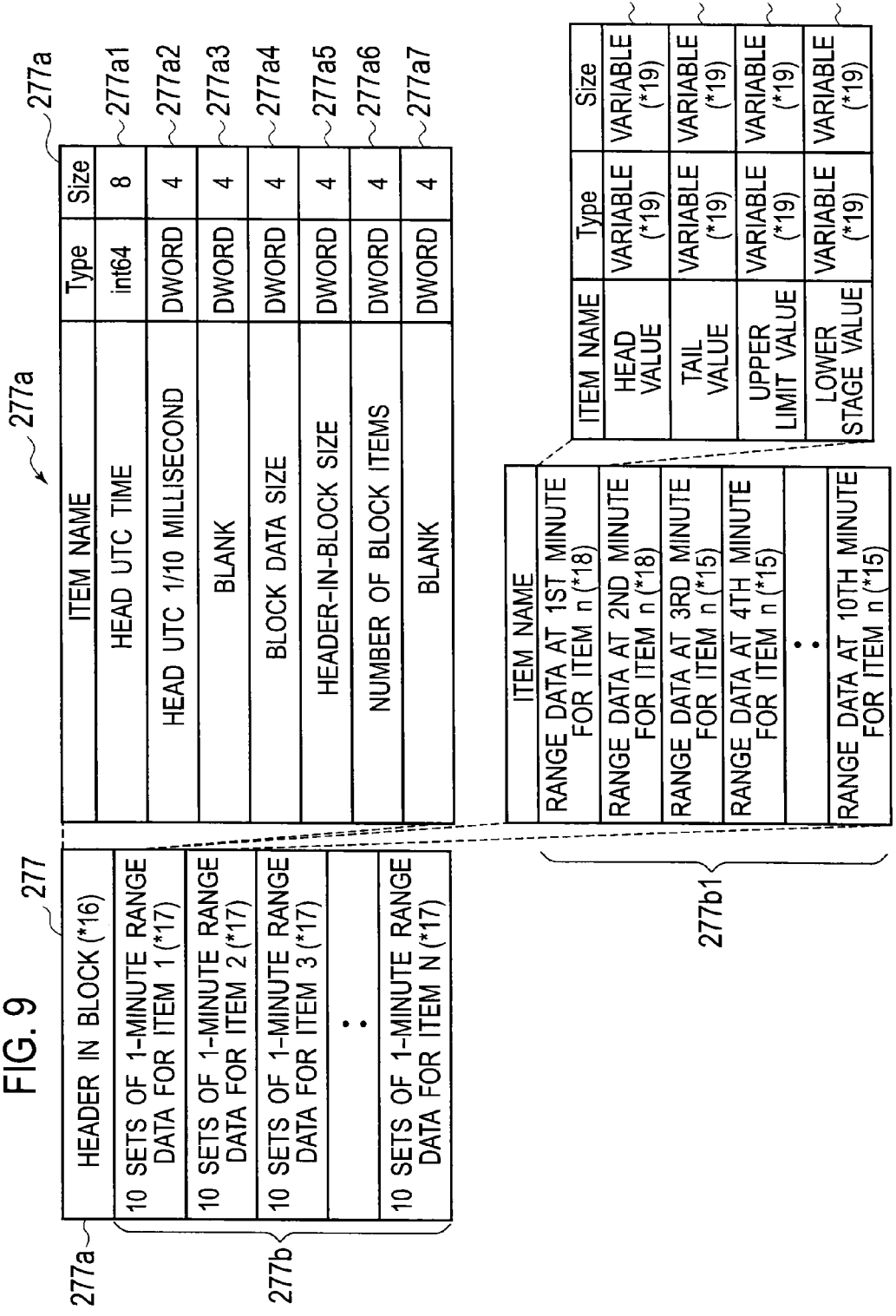

FIG. 9 is a diagram showing an example of block data on the 1-minute range data file stored in the range data storage section in the storage unit included in the data management apparatus of the first embodiment of the present invention.

Figure 10:
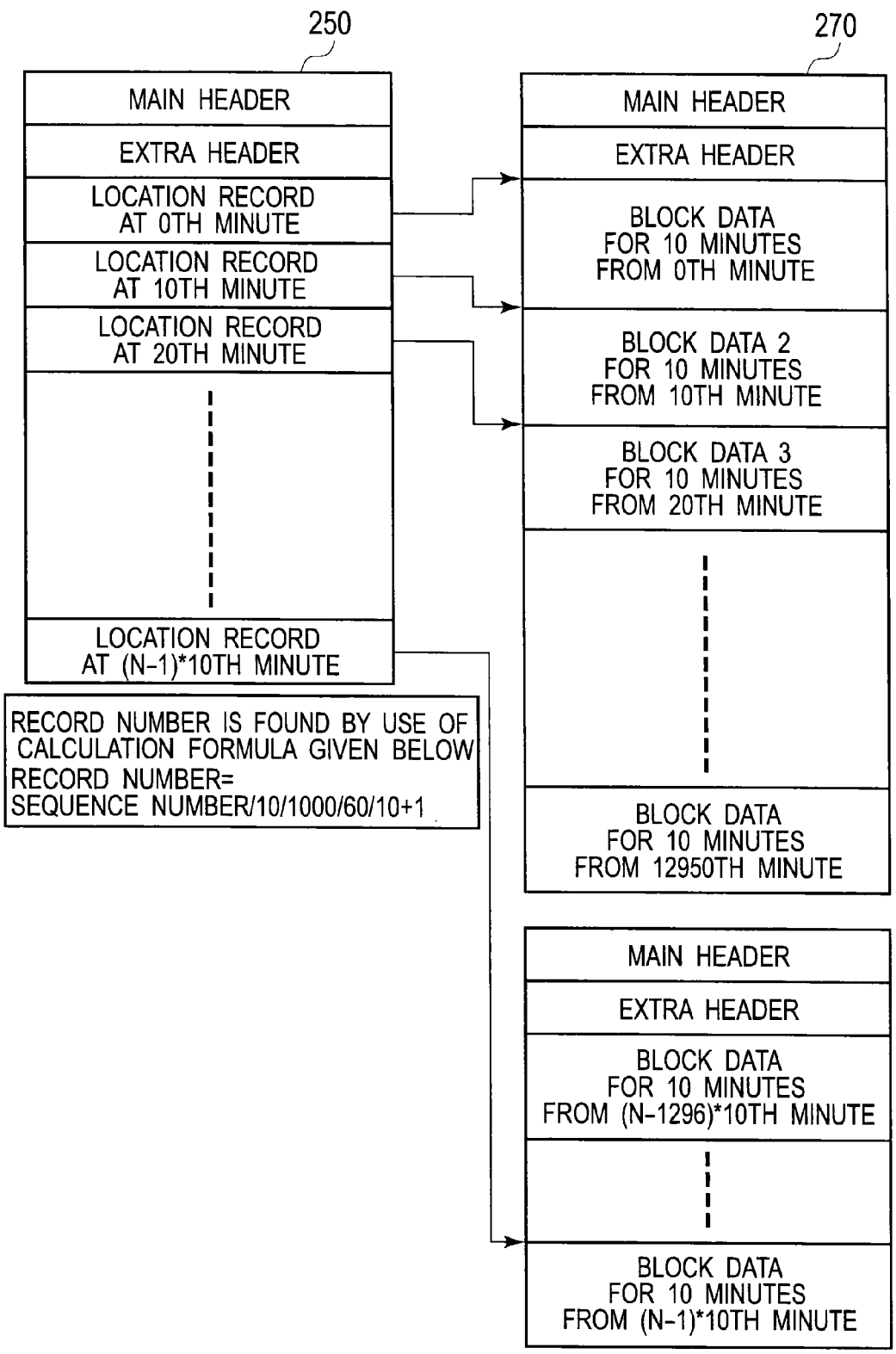

FIG. 10 is a diagram explaining a relationship between the 1-minute range data location file and the 1-minute range data file which are stored in the range data storage section in the storage unit included in the data management apparatus of the first embodiment of the present invention.

Figure 11:
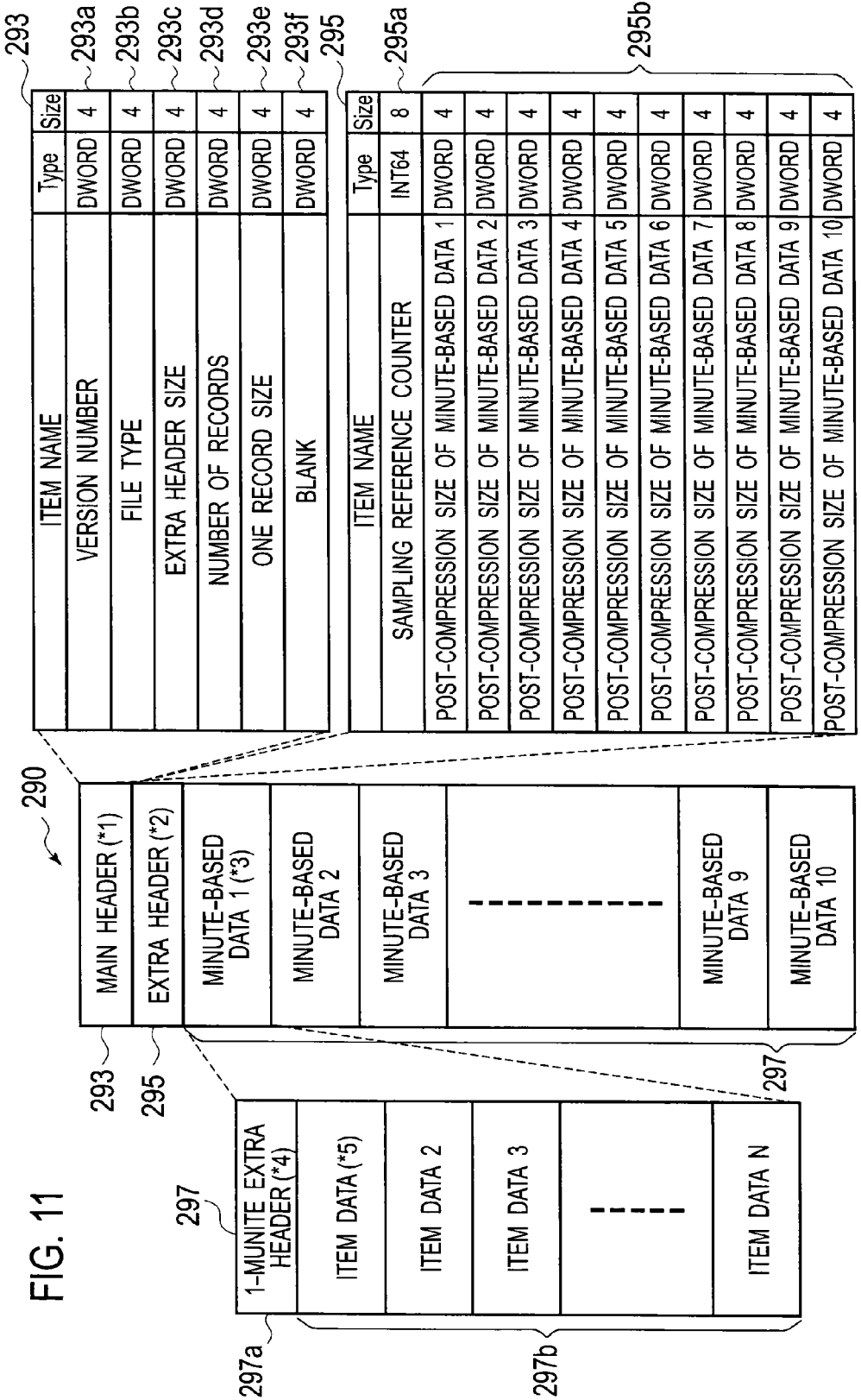

FIG. 11 is a diagram showing an example of a sampling data file stored in a sampling data storage section in the storage unit included in the data management apparatus of the first embodiment of the present invention.

Figure 12:
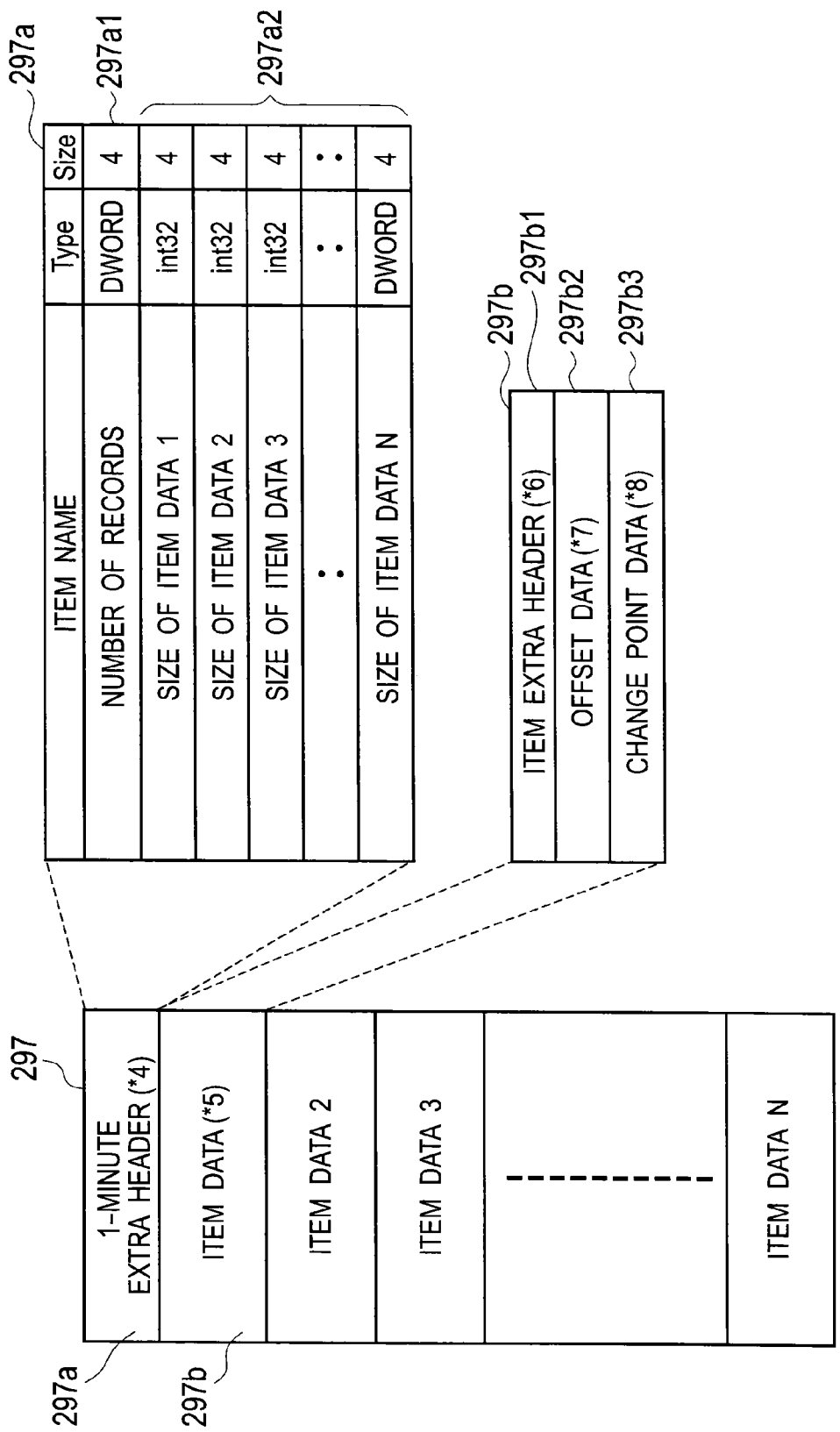

FIG. 12 is a diagram showing an example of a minute-based data stored in the sampling data storage section in the storage unit included in the data management apparatus of the first embodiment of the present invention.

Figure 13:
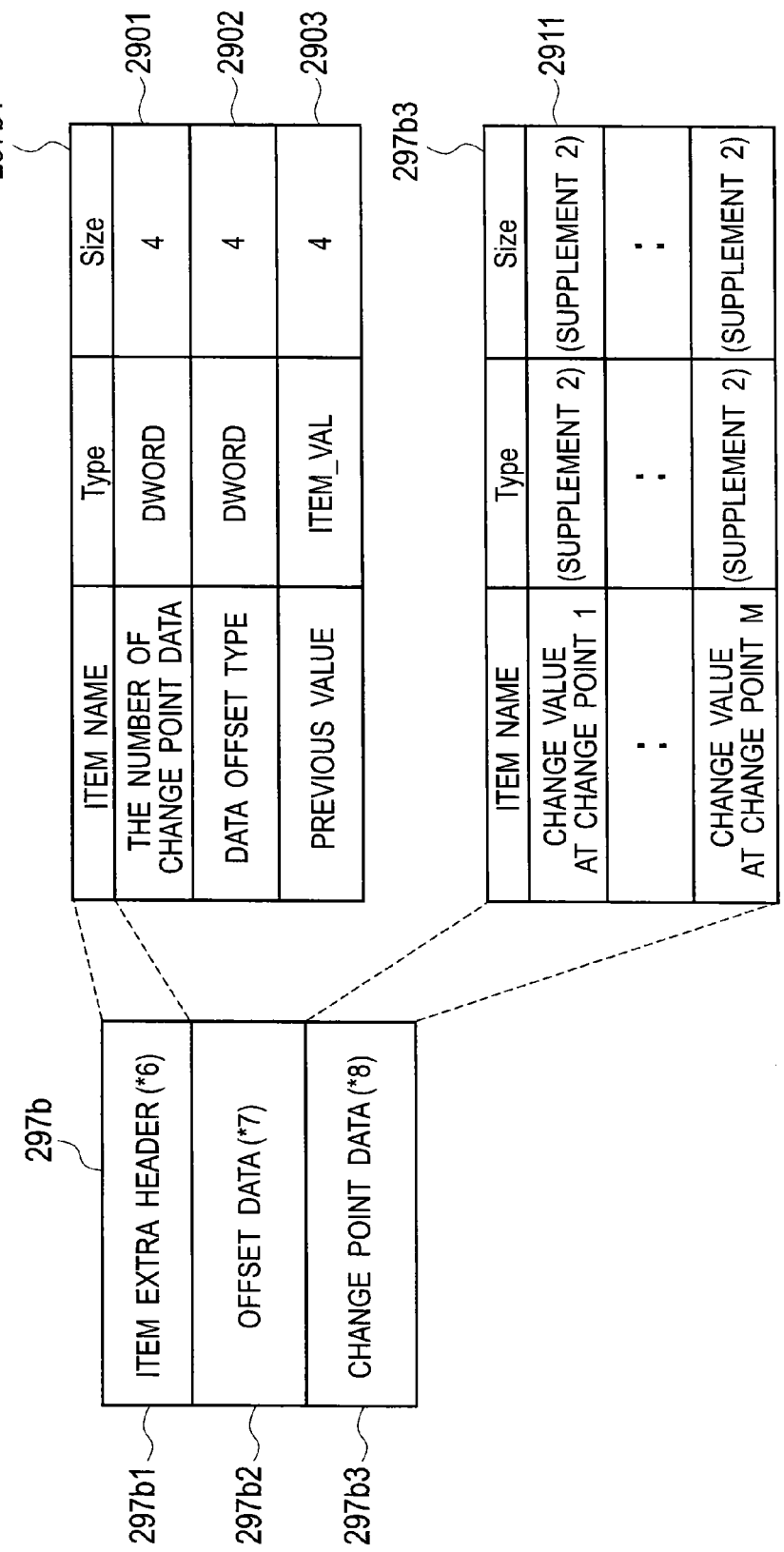

FIG. 13 is a diagram showing an example of the item data stored in the sampling data storage section in the storage unit included in the data management apparatus of the first embodiment of the present invention.

FIG. 14A is a diagram showing an example of the offset data in the arrangement pattern stored in the sampling data storage section in the storage unit included in the data management apparatus of the first embodiment of the present invention.

FIG. 14B is a diagram showing an example of the offset data in the bit pattern stored in the sampling data storage section in the storage unit included in the data management apparatus of the first embodiment of the present invention.

FIG. 15 is a diagram showing an example of the change information included in the offset data in the bit pattern stored in the sampling data storage section in the storage unit included in the data management apparatus of the first embodiment of the present invention.

Figure 16:
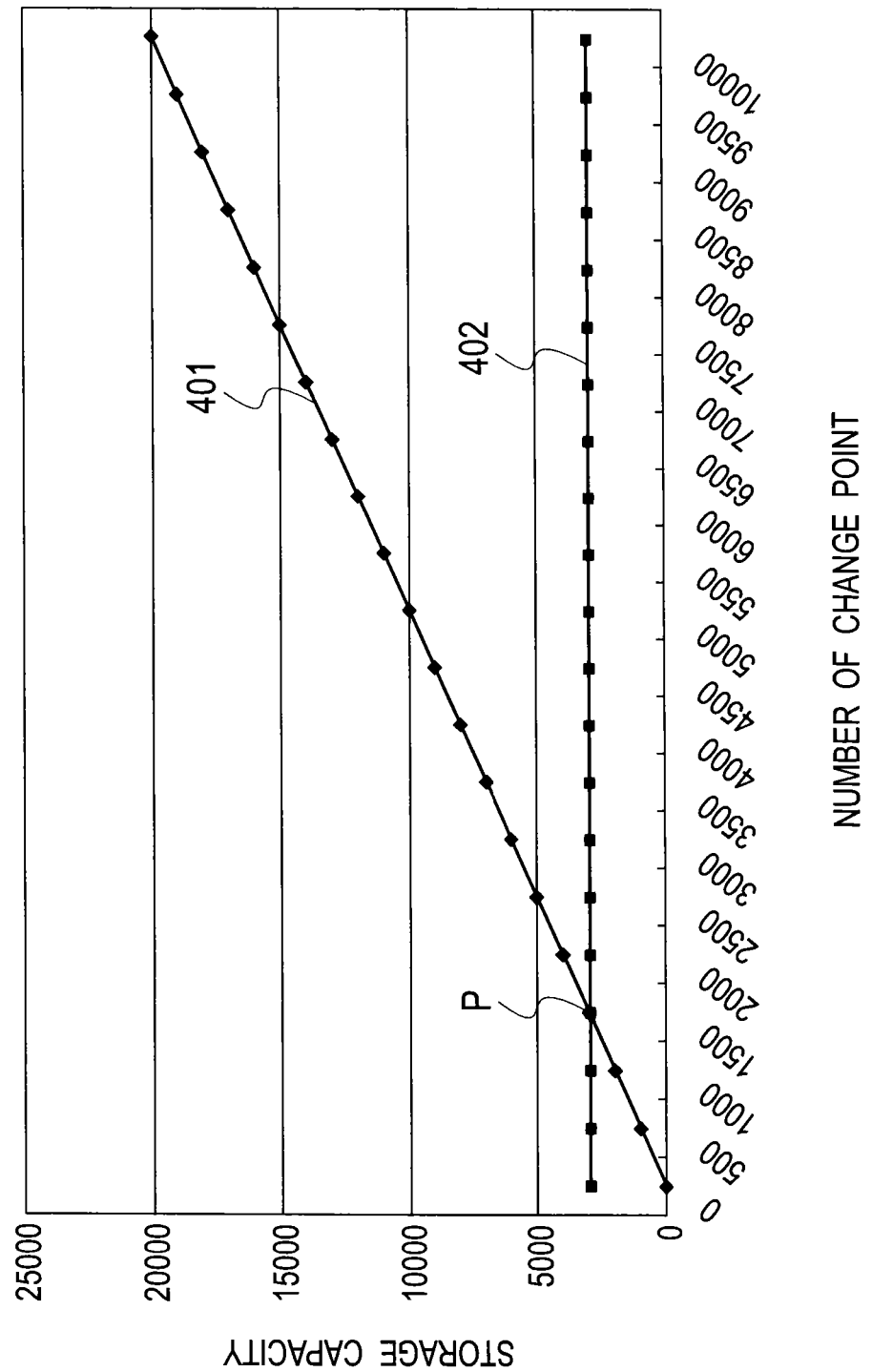

FIG. 16 is a diagram explaining how the data management apparatus of the first embodiment of the present invention performs processing to switch between the arrangement pattern sampling data and the bit pattern sampling data.

MODES FOR CARRYING OUT THE INVENTION

First Embodiment

Descriptions will be hereinbelow provided for a first embodiment respectively of a data management apparatus, a data management method and a data management program of the first embodiment of the present invention.
<Explanation of Configuration>

Figure 1:
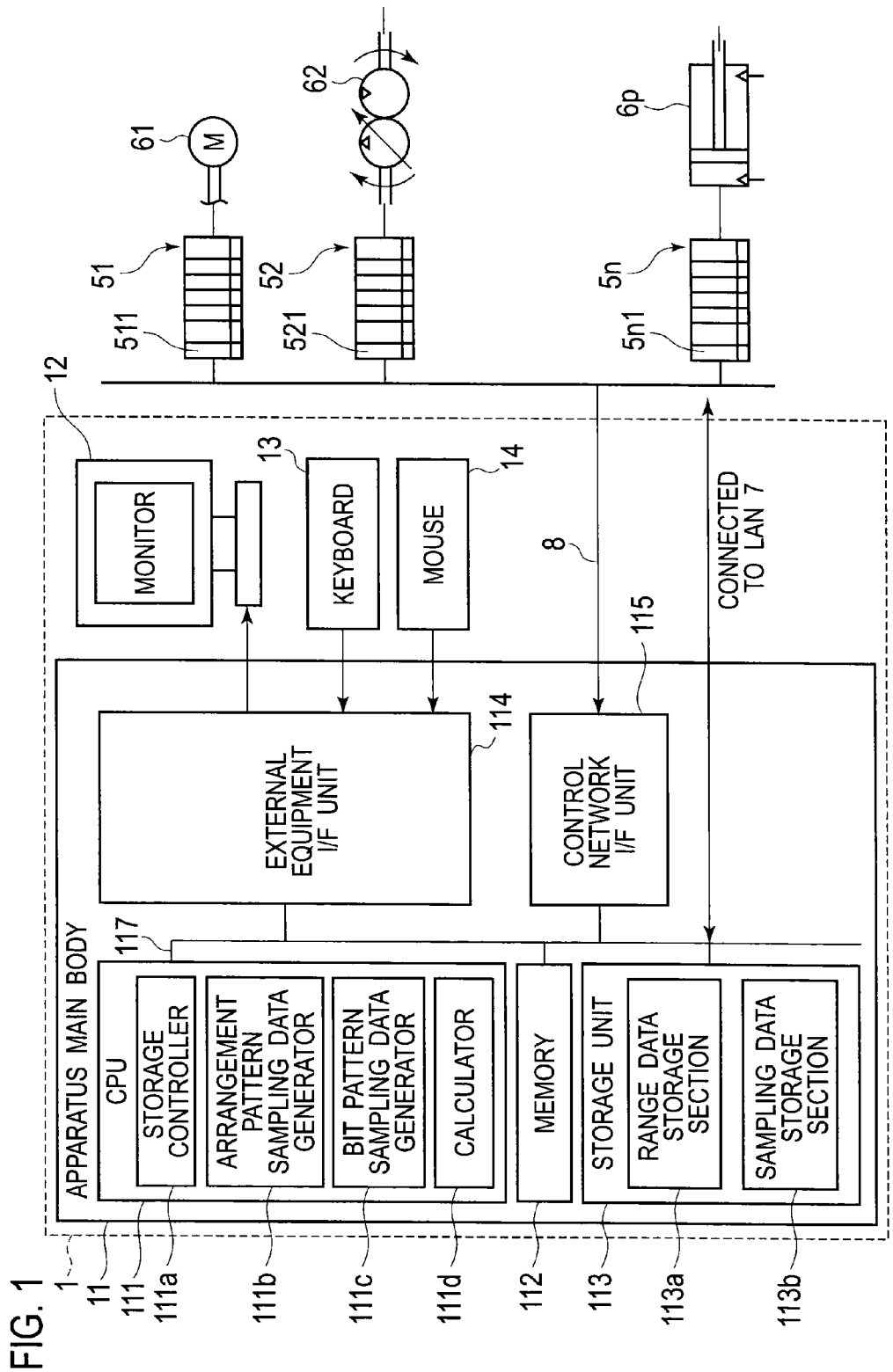
FIG. 1 is a diagram showing an example of a configuration of an online data management system including a data management apparatus of a first embodiment of the present invention.

FIG. 1 is a diagram showing an example of a configuration of an online data management system including a data management apparatus of a first embodiment of the present invention.

This online data management system manages, for example, process data acquired from various monitoring targets in plant systems such as: a hot rolling plant system for making a heated slab of iron, stainless steel or aluminum into a hot-rolled coil with a thickness of several millimeters to ten something millimeters by rolling the slab in a rolling mill; and a process line plant system for performing acid pickling, annealing, plating, coating, cutting and the like on a coil produced by a hot rolling plant or a cold rolling plant for the purpose of making final products out of the coil.

In FIG. 1, the online data management system includes a data management apparatus 1 of the first embodiment of the present invention and controllers 51 to 5*n* (n: an integer) which are connected together. Examples of the controllers 51 to 5*n* include programmable logic controllers (PLC). The online data management system is a system configured to monitor the operating conditions, control conditions and the like of monitoring targets 61 to 6*p* (p: an integer) by use of process data acquired by the controllers 51 to 5*n*. Examples of the monitoring targets 61 to 6*p* include: a rolling mill; a pressing machine; and a motor, pistons and the like for driving such machines.

In this respect, the data management apparatus 1 and the controllers 51 to 5n are connected together through a control network 8, for example.

In addition, the data management apparatus 1 of the first embodiment of the present invention is formed from a computer apparatus in which a monitor (display) 12, a keyboard 13, a mouse 14 and the like are connected to an apparatus main body 11. The data management apparatus 1 is configured to store sampling data inclusive of multiple numerical data which are acquired from the controllers 51 to 5n, and to display the sampling data on the monitor 12 in a normal mode.

Descriptions will be later provided for things such as: a configuration and operations of the data management apparatus of the first embodiment of the present invention; and configurations of the process data.

The controllers 51 to 5n are configured to control the operations of the various monitoring targets 61 to 6p such as a motor, a heating apparatus and a hydraulic apparatus on the basis of programs. The controllers 51 to 5n are configured to acquire the process data, inclusive of the numerical data, which are detected from the various monitoring targets 61 to 6p at predetermined sampling intervals in time series, through the their respective I/O (input/output) units 511 to 5n1.

The data management apparatus 1 is formed from the computer apparatus in which the monitor (display) 12, the keyboard 13, the mouse 14 and the like are connected to its apparatus main body 11.

As shown in FIG. 1, the apparatus main body 11 includes a CPU ill, a memory 112, a storage unit 113 such as a HDD or a large-capacity memory, an external equipment interface (hereinafter abbreviated to I/F) unit 114, a control network I/F unit 115, and the like which are connected together through an internal bus 117.

The CPU 111 functionally includes a storage controller 111a, an arrangement pattern sampling data generator 111b, a bit pattern sampling data generator 111c and a calculator 111d by executing data management programs among various application programs stored in the storage unit 113.

The arrangement pattern sampling data generator 111b generates arrangement patter sampling data in which process data acquired from the controllers 51 to 5n and including a chronological change, and an elapsed time from a reference point of time to a point of time of the chronological change are associated with each other.

Each time process data are acquired from the controllers 51 to 5n, the bit pattern sampling data generator 111c generates bit pattern sampling data in which a flag indicating the presence or absence of the chronological change in the process data acquired from the controller 51 to 5n, and the process data acquired from the controller 51 to 5n and including the chronological change are associated with each other.

The calculator 111d calculates a number-of-change-points threshold value indicating a threshold value for the number of process data each including the chronological change on the basis of a data size needed to store the elapsed time and sampling cycles (acquisition intervals) for the process data acquisition.

The storage controller 111a stores any one of the bit pattern sampling data and the arrangement pattern sampling data, which requires a smaller storage capacity, into the storage unit 113. To put it specifically, each time the process data are acquired from the controllers 51 to 5n, the storage controller 111a stores the bit pattern sampling data if the number of process data each including the chronological change is greater than the change-point threshold value calculated by the calculator 111d, or stores the arrangement pattern sampling data if the number of process data each including the chronological change is less than the change-point threshold value calculated by the calculator 111d.

The memory 112 is used as an operation area or the like which performs temporary storage of data, expansion of the data, and the like when the CPU 111 executes the various application programs.

The storage unit 113 includes the range data storage section 113a and the sampling data storage section 113b.

In the first embodiment, the range data storage section 113a and the sampling data storage section 113b are provided in the single storage unit 113. However, it is a matter of course that the range data storage section 113a and the sampling data storage section 113b may be formed as separate storage units.

The control network I/F unit 115 is an interface configured to connect a control network 8 and the apparatus main body 11 to each other.

Figure 2:
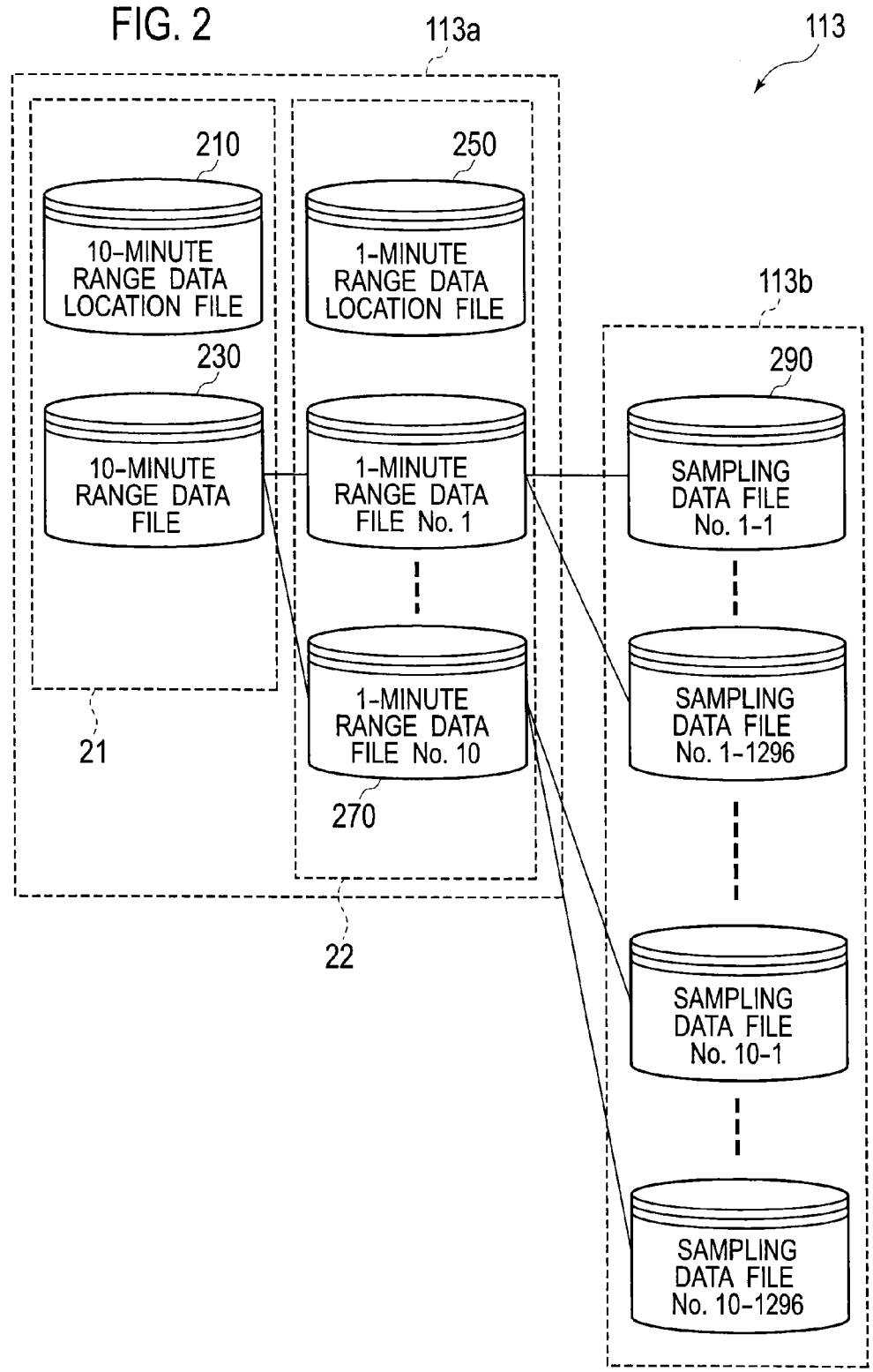
FIG. 2 is a diagram schematically showing a data structure in a storage unit included in the data management apparatus of the first embodiment of the present invention.

FIG. 2 is a diagram schematically showing a data structure in the storage unit 113 included in the data management apparatus 1 of the first embodiment of the present invention.

As shown in FIG. 2, the storage unit 113 includes the range data storage section 113a and the sampling data storage section 113b as its storage areas.

The range data storage section 113a includes a first range data storage section 21 and a second range storage section 22.

In each 10 minutes (first period) from sampling start time (a reference point of time), the first range data storage section 21 stores as the first range data the upper and lower limit values of the process data acquired from each of the controllers 51 to 5n as well as a first reference point of time which is the start time for the first period while associating the upper and lower limit values with the first reference point of time. To put it specifically, the first range data storage section 21 stores a 10-minute range data location file 210 and 10-minute range data files 230.

In each one minute (second period) from the sampling start time (the reference point of time), the second range data storage section 22 stores as the second range data the upper and lower limit values of the process data acquired from each of the controllers 51 to 5n, as well as a second reference point of time which is the start time for the second period while associating the upper and lower limit values with the second reference point of time. To put it specifically, the second range data storage section 22 stores a 1-minute range data location file 250 and 1-minute range data files 270.

The sampling data storage section 113b stores the arrangement pattern sampling data generated by the arrangement pattern sampling data generator 111b, or the bit pattern sampling data generated by the bit pattern sampling data generator 111c.

Figure 3:
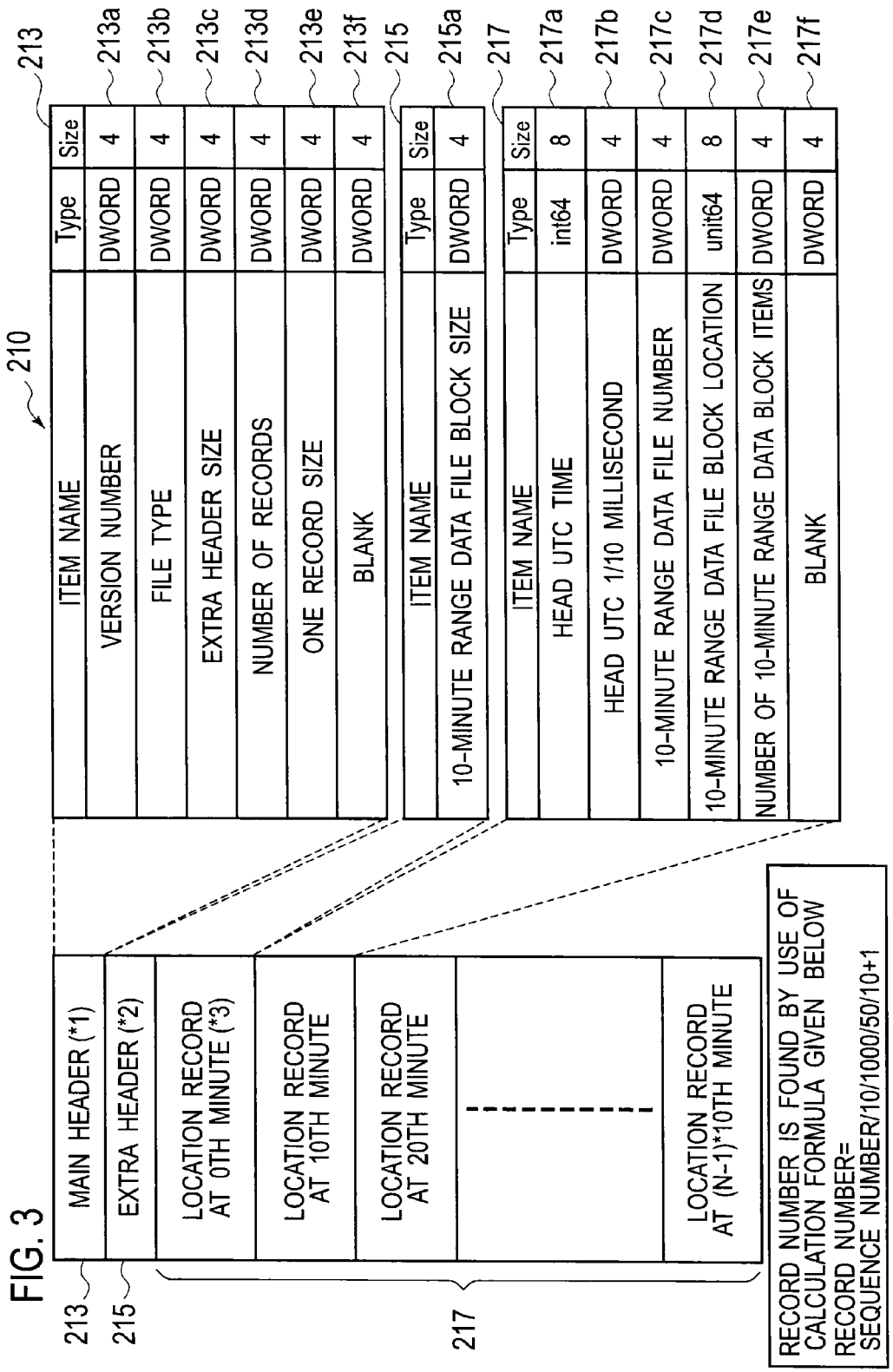
FIG. 3 is a diagram showing an example of a 10-minute range data location file stored in a range data storage section in the storage unit included in the data management apparatus of the first embodiment of the present invention.

FIG. 3 is a diagram showing an example of the 10-minute range data location file 210 stored in the range data storage section 113a in the storage unit 113 included in the data management apparatus 1 of the first embodiment of the present invention.

As shown in FIG. 3, the 10-minute range data location file 210 includes: a main header 213 including fixed information on the 10-minute range data location file; an extra header 215 including extended information on the 10-minute range data location file; and location records 217 each including location information on the 10-minute range data location file.

The main header 213 includes: a version number 213a which is a fixed value; a file type 213b indicating the file type of the 10-minute range data location file 210; an extra header size 213c indicating the size of the extra header 215; the number of records 213d indicating the number of the location records 217; a record size 213e indicating the size of each location record 217; and a blank 213f for reserving a spare area for data storage.

The extra header 215 includes a 10-minute range data file block size 215a indicating the size of a block in which the 10-minute range data file 230 is stored.

Each location record 217 includes: a head UTC time 217a indicating the time (the first reference point of time) corresponding to the head of the 10-minute range data file 230; a head UTC 1/10 millisecond 217b which is time data indicating the head UTC time 217a in the order of 1/10 millisecond; a 10-minute range data file number 217c indicating the file number of the 10-minute range data file; a 10-minute range data file block location 217d indicating a location of the block from the head where the 10-minute range data file 230 is stored; the number of 10-minute range data block items 217e indicating the number of items in the block data on the 10-minute range data file 230; and a blank 217f for reserving a spare area for the data storage.

Since as described above, each location record 217 stores the various 10-minute (first period)-based data acquired from each of the controllers 51 to 5n in each 10 minutes (first period) from the sampling start time (the reference point of time), the head UTC time 217a included in the location record 217 at the head becomes the sampling start time (the reference point of time).

It should be noted that, if represented with accuracy in the order of 1/10 millisecond by use of the head UTC time 217a and the head UTC 1/10 millisecond 217b, the time (the first reference point of time) corresponding to the head of the 10-munite range data file 230 may be used as the first reference point of time. Alternatively, only the head UTC time 217a may be used as the time (the first reference point of time) corresponding to the head of the 10-minute range data file 230.

In addition, location record numbers are numbers assigned to the location records 217, respectively, in the 10-minute range data file 230, and are calculated on the basis of Formula 1 given below. On the basis of the location record numbers, the various data, inclusive of the head UTC time 217a, are stored.

Location Record Number=Sequence Number/10/
1000/60/10+1    (Formula 1)

where the sequence number is a serial number to be counted up each time the process data are collected by the controllers 51 to 5n at the predetermined sampling cycles beginning at the sampling start time (the reference point of time). In this respect, the sampling cycles in which the process data are acquired from the controllers 51 to 5n are determined at 0.1 (ms), for example.

Figure 4:
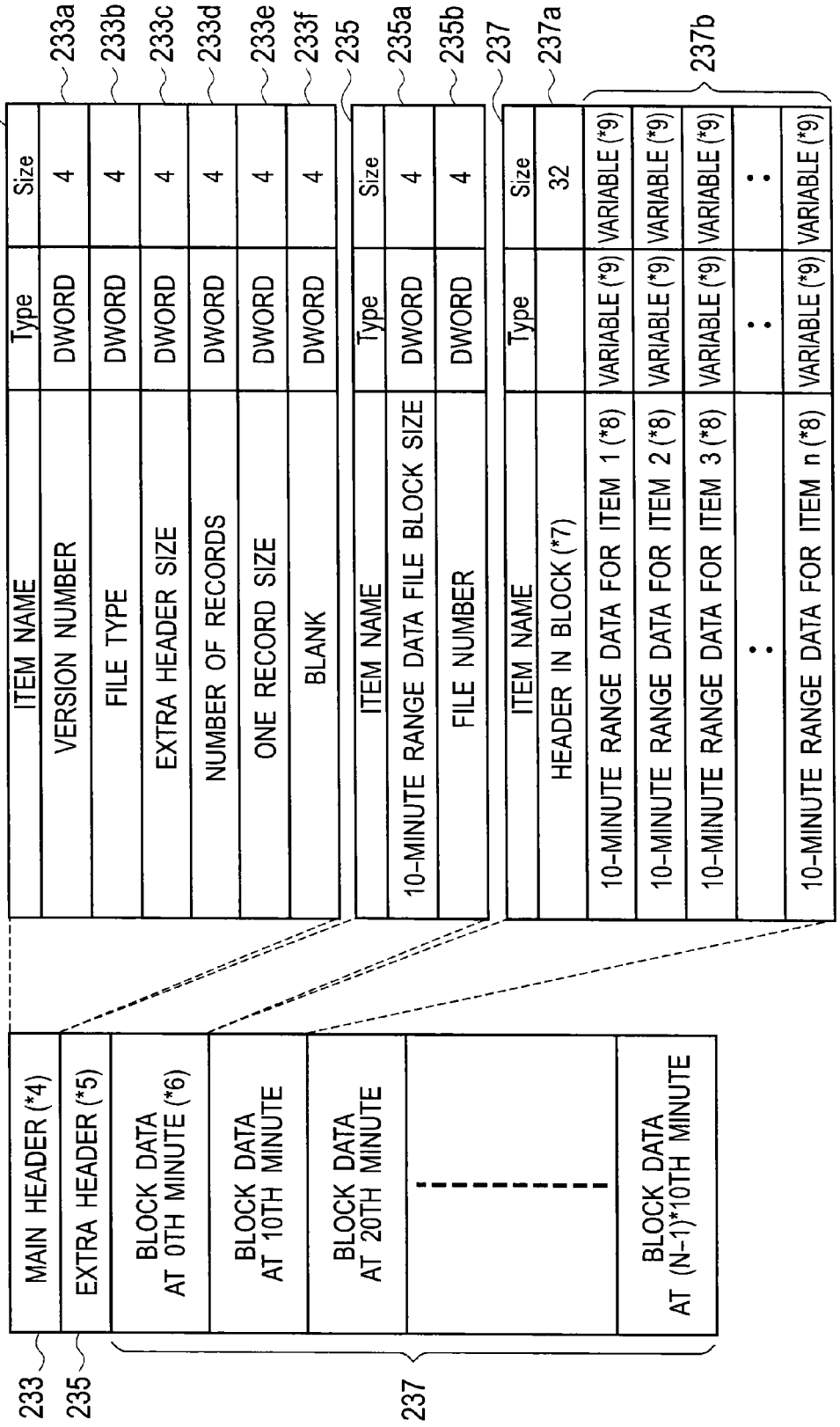
FIG. 4 is a diagram showing an example of a 10-minute range data file stored in the range data storage section in the storage unit included in the data management apparatus of the first embodiment of the present invention.

FIG. 4 is a diagram showing an example of the 10-minute range data file 230 stored in the range data storage section 113a in the storage unit 113 included in the data management apparatus 1 of the first embodiment of the present invention.

As shown in FIG. 4, the 10-minute range data file 230 includes: a main header 233 including fixed information on the 10-minute range data file; an extra header 235 including extended information on the 10-minute range data file; and block data 237 each including the upper and lower limit values of process data in the corresponding 10-minute range, and the like.

The main header 233 includes: a version number 233a which is a fixed value; a file type 233b indicating the file type of the 10-minute range data file 230; an extra header size 233c indicating the size of the extra header 235; the number of records 233d indicating the number of the location records 217; a record size 233e indicating the size of each location record 217; and a blank 233f for reserving an area for alignment.

The extra header 235 includes: a 10-minute range data file block size 235a indicating the size of a block in which the 10-minute range data file 230 is stored; and a file number 235b indicating the file number of the 10-minute range data file 230.

The block data 237 each includes: a header-in-block 237a including fixed information on the block data 237; and 10-minute range data 237b each including the upper and lower limit values of process data in the corresponding 10-minute range for each item number, and the like. In this respect, the item numbers are, for example, uniquely-assigned numbers for identifying items acquired by the controllers 51 to 5n, such as pressing pressures of the rolling mills which are the monitoring targets 61 to 6p.

FIG. 5 is a diagram showing an example of block data 237 on a 10-minute range data file 230 stored in the range data storage section 113a in the storage unit 113 included in the data management apparatus 1 of the first embodiment of the present invention.

As shown in FIG. 5, the header in block 237a includes: a head UTC time 237a1 indicating the time (the first reference point of time) corresponding to the head of the block data 237; a head UTC 1/10 millisecond 237a2 which is time data indicating the head UTC time 237a1 in the order of 1/10 millisecond; a blank 237a3 for reserving a spare area for data storage; a block data size 237a4 indicating the size of the block data 237 excluding the size of the header-in-block 237a; a header-in-block size 237a5 indicating the size of the header-in-block 237a; the number of block items 237a6 indicating the number of items in the 10-minute range data 237b in the block data 237; and a blank 237a7 for reserving a spare area for data storage.

In addition, for each item number, the 10-minute range data 237b include: a head value 237b1 indicating the process data at the head of the 10-minute range data 237b; a tail value 237b2 indicating the process data at the tail of the 10-minute range data 237b; an upper limit value 237b3 indicating the upper limit value of the process data in a range corresponding to the 10-minute range data 237b; and a lower limit value 237b4 indicating the lower limit value of the process data in the range corresponding to the 10-minute range data 237b.

Since as described above, the block data 237 store the various 10-minute (first period)-based data acquired from each of the controllers 51 to 5n in each 10 minutes (first period) from the sampling start time (the reference point of time), the head UTC time 237a1 included in the block data 237 at the head becomes the sampling start time (the reference point of time).

It should be noted that, if represented with accuracy in the order of 1/10 millisecond by use of the head UTC time 237a1 and the head UTC 1/10 millisecond 237b2, the time (the first reference point of time) corresponding to the head of the 10-munite range data file 230 may be used as the first reference point of time. Alternatively, only the head UTC time 237a1 may be used as the time (the first reference point of time) corresponding to the head of the 10-minute range data file 230.

As described above, in each 10 minutes (first period) from the sampling start time (the reference point of time), the range data storage section 113a stores the upper and lower limit values of the 10-minute (first period)-based process data acquired from each of the controllers 51 to 5n as well as the first reference point of time which is the start time for the minutes (the first period), as the 10-minute range data file 230 (the first range data), while associating the upper and lower limit values with the first reference point of time.

FIG. 6 is a diagram explaining a relationship between the 10-minute range data location file 210 and the 10-minute range data file 230 which are stored in the range data storage section 113a in the storage unit 113 included in the data management apparatus 1 of the first embodiment of the present invention.

As shown in FIG. 6, on the basis of the data stored in the 10-minute range data location file 210, the storage controller 111a is capable of storing data into the 10-minute range data file 230.

To put it specifically, as described above, the storage controller 111a in the CPU 111 calculates location record numbers to be assigned to the location records 217 in the 10-munite range data file 230 by use of Formula 1. Thereby, on the basis of the calculated location record numbers, the storage controller 111a is capable of storing the block data 237 into the 10-minute range data file 230.

FIG. 7 is a diagram showing an example of a 1-minute range data location file 250 stored in the range data storage section 113a in the storage unit 113 included in the data management apparatus 1 of the first embodiment of the present invention.

As shown in FIG. 7, the 1-minute range data location file 250 includes: a main header 253 including fixed information on the 1-minute range data location file; an extra header 255 including extended information on the 1-minute range data location file 250; and location records 257 each including location information on the 1-minute range data location file 250.

The main header 253 includes: a version number 253a which is a fixed value; a file type 253b indicating the file type of the 1-minute range data location file 250; an extra header size 253c indicating the size of the extra header 255; the number of records 253d indicating the number of the location records 257; a record size 253e indicating the size of each location record 257; and a blank 253f for reserving a spare area for data storage.

The extra header 255 includes a 1-minute range data file block size 255a indicating the size of a block in which the 1-minute range data file is stored.

Each location record 257 includes: a head UTC time 257a indicating the time (the second reference point of time) corresponding to the head of the 1-minute range data file; a head UTC 1/10 millisecond 257b which is time data indicating the head UTC time 257a in the order of 1/10 millisecond; a 1-minute range data file number 257c indicating the file number of the 1-minute range data file; a 1-minute range data file block location 257d indicating a location of the block from the head where the 1-minute range data file is stored; the number of 1-minute range data block items 257e indicating the number of items in the block data on the 1-minute range data file; and a blank 257f for reserving a spare area for the data storage.

Since as described above, each location record 257 stores the various 1-minute (second period)-based data acquired from each of the controllers 51 to 5n in each minute (second period) from the sampling start time (the reference point of time), the head UTC time 257a included in the location record 257 at the head becomes the sampling start time (the reference point of time).

In this respect, it should be noted that the location record numbers are numbers assigned to the location records 257, respectively, in the 1-minute range data file, and are calculated on the basis of Formula 1 given above.

As described above, in each one minute (second period) from the sampling start time (the reference point of time), the range data storage section 113a stores the upper and lower limit values of the 1-minute (second period)-based process data acquired from each of the controllers 51 to 5n as well as the second reference point of time which is the start time for the one minute (the second periods), as the 1-minute range data file 270 (the second range data), while associating the upper and lower limit values with the second reference point of time.

FIG. 8 is a diagram showing an example of a 1-minute range data 270 file stored in the range data storage section 113a in the storage unit 113 included in the data management apparatus 1 of the first embodiment of the present invention.

As shown in FIG. 8, the 1-minute range data file 270 includes: a main header 273 including fixed information on the 1-minute range data file; an extra header 275 including extended information on the 1-minute range data file; and block data 277 each including the upper and lower limit values of process data in the corresponding 1-minute range, and the like.

The main header 273 includes: a version number 273a which is a fixed value; a file type 273b indicating the file type of the 1-minute range data file 270; an extra header size 273c indicating the size of the extra header 275; the number of records 273d indicating the number of the location records 217; a record size 273e indicating the size of each location record 217; and a blank 273f for reserving an area for alignment.

The extra header 275 includes: a 1-minute range data file block size 275a indicating the size of a block data stored in the 1-minute range data file; and a file number 275b indicating the file number of the 1-minute range data file.

The block data 277 each include: a header-in-block 277a including fixed information on the block data 277; and 10 sets of 1-minute range data 277b, for each item number, including the upper and lower limit values in 10 sets of 1-minute range process data and the like.

FIG. 9 is a diagram showing an example of the block data 277 on the 1-minute range data file 270 stored in the range data storage section 113a in the storage unit 113 included in the data management apparatus 1 of the first embodiment of the present invention.

As shown in FIG. 9, the header in block 277a includes: a head UTC time 277a1 indicating the time (the second reference point of time) corresponding to the head of the block data 277; a head UTC 1/10 millisecond 277a2 which is time data representing the head UTC time 277a1 in the order of 1/10 millisecond; a blank 277a3 for reserving a spare area for data storage; a block data size 277a4 indicating the size of the block data 237 excluding the size of the header-in-block 277a; a header-in-block size 277a5 indicating the size of the header-in-block 277a; the number of block items 277a6 indicating the number of the 1-minute range data 277b in the block data 277; and a blank 277a7 for reserving a spare area for data storage.

Since as described above, the block data 717 store the various 1-minute (second period)-based data acquired from each of the controllers 51 to 5n in each one minute (second period) from the sampling start time (the reference point of time), the head UTC time 277a1 included in the block data 277 at the head becomes the sampling start time (the reference point of time).

It should be noted that, if represented with accuracy in the order of $1/10$ millisecond by use of the head UTC time 277a1 and the head UTC $1/10$ millisecond 277b1, the time (the second reference point of time) corresponding to the head of the 1-munite range data file 250 may be used as the second reference point of time. Alternatively, only the head UTC time 277a1 may be used as the time (the second reference point of time) corresponding to the head of the 1-minute range data file 250.

Furthermore, the 10 sets of 1-minute range data 277b include sets of 1-minute range data 277b1 for each item number.

Each set of 1-munite range data 277b1 include: a head value 277b11 indicating the process data at the head of the 1-minute range data 277b1; a tail value 277b12 indicating the process data at the tail of the 1-minute range data 277b1; an upper limit value 277b13 indicating the upper limit value of the process data in a range corresponding to the 1-minute range data 277b1; and a lower limit value 277b14 indicating the lower limit value of the process data in the range corresponding to the 1-minute range data 277b1.

FIG. 10 is a diagram explaining a relationship between the 1-minute range data location file 250 and the 1-minute range data file 270 which are stored in the range data storage section 113a in the storage unit 113 included in the data management apparatus 1 of the first embodiment of the present invention.

As shown in FIG. 10, on the basis of the data stored in the 1-minute range data location file 250, the storage controller 111a is capable of storing data into the 1-minute range data file 270.

To put it specifically, as described above, the storage controller 111a in the CPU 111 calculates the location record numbers to be assigned to the location records 257 in the 1-minute range data file 250 by use of Formula 1. Thereby, on the basis of the calculated location record numbers, the storage controller 111a is capable of storing the block data 277 into the 1-minute range data file 270.

The sampling data storage section 113b stores the sampling data files 290.

FIG. 11 is a diagram showing an example of a sampling data file 290 stored in the sampling data storage section 113b in the storage unit 113 included in the data management apparatus 1 of the first embodiment of the present invention.

As shown in FIG. 11, the sampling data file 290 includes: a main header 293 including fixed information on the sampling data file 290; an extra header 295 including extended information on the sampling data file 290; and minute-based data 297 each including process data.

The main header 293 includes: aversion number 293a which is a fixed value; a file type 293b indicating the file type of the sampling data file 290; an extra header size 293c indicating the size of the extra header 295; the number of records 293d indicating the number of the minute-based data 297; a record size 293e indicating the size of the minute-based data 297; and a blank 293f for reserving an area for alignment.

The extra header 295 includes: a sampling reference counter 295a indicating a sequence number with which the sampling data file 290 for 10 minutes starts to be recorded; and post-compression sizes 295b of the respective compressed minute-based data 297.

The minute-based data 297 each include: a 1-minute extra header 297a including fixed information on the minute-based data 297; and item data 297b indicating data on the respective items.

FIG. 12 is a diagram showing an example of the minute-based data 297 stored in the sampling data storage section 113b in the storage unit 113 included in the data management apparatus 1 of the first embodiment of the present invention.

As shown in FIG. 12, the minute-based data 297 include the 1-minute extra header 297a and the item data 297b.

The 1-minute extra header 297a includes: the number of records 297a1 indicating the number of the registered item data 297b; and item data sizes 297a2 indicating the sizes of the respective item data 297b.

The item data 297b each include: an item extra header 297b1 including fixed information on the item data 297b; offset data 297b2; and change point data 297b3 indicating process data at a point of time when there is a change in the process data.

FIG. 13 is a diagram showing an example of the item data 297b stored in the sampling data storage section 113b in the storage unit 113 included in the data management apparatus 1 of the first embodiment of the present invention.

The item extra header 297b1 includes: the number of change point data 2901 indicating the number of the change point data; a data offset type 2902 indicating whether the offset data are stored in a bit pattern or in an arrangement pattern; and a previous value 2903 indicating a previous value.

The change point data 297b3 stores process data 2911 including the chronological change for each change point.

The offset data 297b2 stores any one of the bit pattern and the arrangement pattern, which is selected depending on the storage capacity needed for storage.

FIG. 14A is a diagram showing an example of the offset data in the arrangement pattern stored in the sampling data storage section 113b in the storage unit 113 included in the data management apparatus 1 of the first embodiment of the present invention.

As shown in FIG. 14A, the offset data 297b2 include an arrangement pattern offset 2920 stored as an elapsed time (in milliseconds) from the sampling start time (the reference point of time) to a point of time of a chronological change in process data 2911.

There are two types of the arrangement pattern offset 2920, namely, a normal mode and a wide mode. The normal mode expresses the elapsed time using 8 bits, while the wide mode expresses the elapsed time using 16 bits.

As described above, when the arrangement pattern offset 2920 is stored into the offset data 297b2, the change point data 297b3 which are the process data acquired from the controllers 51 to 5n and including the chronological change, and the offset data 297b2 which include the arrangement pattern offset 2920 expressing the elapsed time from the sampling start time (the reference point of time) to the point of time of the chronological change in the process data 2911 are associated with each other and stored as the arrangement pattern sampling data.

FIG. 14B is a diagram showing an example of the offset data in the bit pattern stored in the sampling data storage section 113b in the storage unit 113 included in the data management apparatus 1 of the first embodiment of the present invention.

As shown in FIG. 14B, the offset data 297b2 include change information 2930 which is a flag indicating whether or not acquired process data include a chronological change for each sampling cycle for the process data collection.

FIG. 15 is a diagram showing an example of the change information 2930 included in the offset data in the bit pattern stored in the sampling data storage section 113b in the storage unit 113 included in the data management apparatus 1 of the first embodiment of the present invention.

As shown in FIG. 15, in the change information 2930 included in the offset data 297b2 in the bit pattern, "1" or "0" is stored as the flag indicating the presence or absence of a chronological change in process data collected in each sampling cycle like in change information 301 to 316. In this respect, the change information stores "1" if the acquired process data include a chronological change, and stores "0" if the acquired process data include no chronological change.

For example, since there are no preceding process data at the sampling start time, the storage controller 111a judges that the process data include a chronological change, and stores into the value of the change information 301. Thereafter, "1" if the process data include no chronological change for each 1-millisecond sampling cycle from 1 millisecond to 9 milliseconds past the sampling start time, the storage controller 111a stores "0" into the values of the change information 302 to 309. After that, if the process data include a chronological change from 9 milliseconds to 10 milliseconds past the sampling start time, the storage controller 111a stores "1" into the value of the change information 310.

As described above, when the change information 2930 on the bit pattern is stored into the offset data 297b2, each time process data are acquired from the controllers 51 to 5n, the offset data 297b2 (the change information) which are the flag indicating the presence or absence of a chronological change in the process data acquired from the controllers 51 to 5n, and the change point data 297b3 which are the process data including the chronological change are associated with each other and stored as the bit pattern sampling data.

<Operation of Data Management Apparatus 1>

Next, descriptions will be provided for how the data management apparatus 1 of the first embodiment of the present invention performs processing to switch between the arrangement pattern sampling data and the bit pattern sampling data.

FIG. 16 is a diagram explaining how the data management apparatus 1 of the first embodiment of the present invention performs processing to switch between the arrangement pattern sampling data and the bit pattern sampling data. The X-axis indicates the number of change points in the process data, while the Y-axis indicates the storage capacity needed to store the offset data 297b2.

As shown in the offset data 401 stored in the arrangement pattern in FIG. 16, if the number of change points in the process data is zero, the offset data 401 are stored only at the sampling start time, because no offset data 401 are stored if there are no chronological change in the process data.

Thereafter, as the number of chronological changes in the process data becomes larger, the number of offsets 2920 (elapsed times) to be stored increases, and the storage capacity needed to store the offset data 297b2 accordingly increases.

On the other hand, as shown in the offset data 402 stored in the bit pattern, the storage capacity needed to store the offset data 297b2 is constant regardless of the chronological change in the process data, because in each sampling cycle for the process data collection, "1" or "0" is stored as the flag indicating the presence or absence of the chronological change in the process data.

For this reason, as shown in FIG. 16, if the number of change points is less than point P, the storage of the offset data 401 in the arrangement pattern makes the needed storage capacity smaller. If the number of change points is greater than the point P, the storage of the offset data 402 in the bit pattern makes the needed storage capacity smaller. The point P is referred to as a number-of-change-points threshold value.

On the basis of the data size needed to store the offsets 2920 (the elapsed times) and the sampling cycles (the acquisition intervals) for the process data acquisition, the calculator 111d in the CPU 111 calculates the number-of-change-points threshold value P indicating the threshold value for the number of process data each including the chronological change by use of Formula 2 given below.

$$P = 60{,}000 \text{ (milliseconds)}/S/B \qquad \text{(Formula 2)}$$

where S denotes the sampling cycles, and B denotes the storage capacity needed to store one offset in the arrangement pattern.

Let us assume, for example, that the storage capacity B needed to store one offset in the arrangement pattern is 16 bits in the case where each sampling cycle S is 2 milliseconds and the wide mode is designated. In this case, the number-of-change-points threshold value P is 1,875 (=60,000/2/16).

In this case, if the number of change points in the process data is less than the number-of-change-points threshold value P (=1,875), the storage of the offset data in the arrangement pattern makes the needed storage capacity smaller. If the number of change points in the process data is greater than the point P, the storage of the offset data in the bit pattern makes the needed storage capacity smaller.

For this reason, each time process data are acquired from the controllers 51 to 5n, the storage controller 111a in the CPU 111 stores the bit pattern sampling data into the sampling data storage section 113b if the number of change points each including a chronological change is greater than the change-point threshold value P calculated by the calculator 111d, or stores the arrangement pattern sampling data in the sampling data storage section 113b if the number of change points each the chronological change is less than the change-point threshold value P calculated by the calculator 111d.

As described above, the data management apparatus 1 of the first embodiment of the present invention includes: the arrangement pattern sampling data generator 111b for generating the arrangement pattern sampling data in which the process data acquired from the controllers 51 to 5n and including the chronological change, and the elapsed time from the reference point of time are associated with each other; the bit pattern sampling data generator 111c for, each time process data are acquired from the controllers 51 to 5n, generating the bit pattern sampling data in which the flag indicating the presence or absence of the chronological change in the process data acquired from the controllers 51 to 5n, and the process data, are associated with each other; the calculator 111d for calculating the number-of-change-points threshold value indicating the threshold value for the number of process data each including the chronological change on the basis of the data size needed to store the elapsed times and the sampling cycles (the acquisition intervals) for the process data acquisition; and the storage controller 111a for storing any one of the bit pattern sampling data and the arrangement pattern sampling data, which requires a smaller storage capacity, into the storage unit 113. For this reason, the data management apparatus 1 is capable of storing a large amount of process data into a relatively small storage area.

- 1 data management apparatus
- 8 control network
- 11 apparatus main body
- 12 monitor
- 13 keyboard
- 14 mouse
- 21 first range data storage section
- 22 second range data storage section
- 51 to 5$n$ controller
- 61 to 6$p$ monitoring target
- 111 CPU
- 111$a$ storage controller
- 111$b$ first judgment section
- 111$c$ second judgment section
- 111$d$ extractor
- 112 memory
- 113 storage unit
- 113$a$ range data storage section
- 113$b$ sampling data storage section

INDUSTRIAL APPLICABILITY

The present invention is applicable to an online data management system for monitoring a plant, and the like.

The invention claimed is:

1. A data management apparatus comprising:
an arrangement pattern sampling data generator for generating arrangement pattern sampling data in which process data acquired from a monitoring target and including a chronological change, and an elapsed time from a reference point of time to a point of time of the chronological change are associated with each other;
a bit pattern sampling data generator for, each time process data are acquired from the monitoring target, generating bit pattern sampling data in which a flag indicating a presence or an absence of the chronological change in the process data acquired from the monitoring target, and the process data acquired from the monitoring target and including the chronological change are associated with each other;
a storage controller for storing any one of the bit pattern sampling data and the arrangement pattern sampling data, which requires a smaller storage capacity, into a storage;
a plant control system coupled with the storage and configured to retrieve any one of the stored bit pattern sampling data and the stored arrangement pattern sampling data from the storage to control a plant including the monitoring target.

2. The data management apparatus of claim 1 further comprising:
a calculator for calculating a number-of-change-points threshold value indicating a threshold value for a number of process data each including the chronological change based on a data size needed to store the elapsed time and acquisition intervals for a process data acquisition;
wherein each time process data are acquired from the monitoring target, the storage controller stores the bit pattern sampling data if the number of process data each including the chronological change is greater than the change-point threshold value calculated by the calculator, or stores the arrangement pattern sampling data if the number of process data each including the chronological change is less than the change-point threshold value calculated by the calculator.

3. An data management method comprising:
generating arrangement pattern sampling data in which process data acquired from a monitoring target and including a chronological change, and an elapsed time from a reference point of time to a point of time of the chronological change, are associated with each other;
each time process data are acquired from the monitoring target, generating bit pattern sampling data in which a flag indicating a presence or an absence of the chronological change in the process data acquired from the monitoring target, and the process data acquired from the monitoring target and including the chronological change are associated with each other;
storing any one of the bit pattern sampling data and the arrangement pattern sampling data, which requires a smaller storage capacity, into a storage; and
retrieving any one of the stored bit pattern sampling data and the stored arrangement pattern sampling data from the storage to control a plant including the monitoring target by a plant control system coupled with the storage.

4. The data management method of claim 3 further comprising:
calculating a number-of-change-points threshold value indicating a threshold value for a number of process data each including the chronological change based on a data size needed to store the elapsed time and acquisition intervals for a process data acquisition;
wherein each time process data are acquired from the monitoring target, the bit pattern sampling data is stored in the storage controlling step if the number of process data each including the chronological change is greater than the change-point threshold value calculated during the calculation of the number-of-change-points threshold value or the arrangement pattern sampling data is stored in the storage controlling step if the number of process data each including the chronological change is less than the change-point threshold value calculated during the calculation of the number-of-change-points threshold value.

5. A data management program causing a computer to execute:
generating arrangement pattern sampling data in which process data acquired from a monitoring target and including a chronological change, and an elapsed time from a reference point of time to a point of time of the chronological change are associated with each other;
each time process data are acquired from the monitoring target, generating bit pattern sampling data in which a flag indicating a presence or an absence of the chronological change in the process data acquired from the monitoring target, and the process data acquired from the monitoring target and including the chronological change are associated with each other;
storing any one of the bit pattern sampling data and the arrangement pattern sampling data, which requires a smaller storage capacity, into a storage; and
retrieving any one of the stored bit pattern sampling data and the stored arrangement pattern sampling data from the storage to control a plant including the monitoring target by a plant control system coupled with the storage.

6. The data management program of claim 5 causing the computer to execute:

calculating a number-of-change-points threshold value indicating a threshold value for a number of process data each including the chronological change based on a data size needed to store the elapsed time and acquisition intervals for process data acquisitions;

wherein each time process data are acquired from the monitoring target, the bit pattern sampling data is stored during the storing if the number of process data each including the chronological change is greater than the change-point threshold value calculated during the calculation of the number-of-change-points threshold value, and the arrangement pattern sampling data is stored during the storing if the number of process data each including the chronological change is less than the change-point threshold value calculated during the calculation of the number-of-change-points threshold value.

* * * * *